(12) United States Patent
Broadbent

(10) Patent No.: US 8,176,034 B2
(45) Date of Patent: May 8, 2012

(54) METHOD FOR INTEGRATING ROAD NAMES AND POINTS OF INTEREST IN SOURCE DATA

(75) Inventor: Matt Broadbent, Guishan Township, Taoyuan County (TW)

(73) Assignee: Mitac International Corporation, Guishan Township, Taoyuan (TW)

( * ) Notice: Subject to any disclaimer, the term of this patent is extended or adjusted under 35 U.S.C. 154(b) by 407 days.

(21) Appl. No.: 12/385,804

(22) Filed: Apr. 21, 2009

(65) Prior Publication Data

US 2010/0250536 A1    Sep. 30, 2010

(30) Foreign Application Priority Data

Mar. 25, 2009  (TW) ............................... 98109634 A

(51) Int. Cl.
*G06F 7/00*    (2006.01)
(52) U.S. Cl. ......................................................... 707/712
(58) Field of Classification Search .................... 707/712
See application file for complete search history.

(56) References Cited

U.S. PATENT DOCUMENTS 6,058,350 A * 5/2000 Ihara .............................. 701/93
2004/0236498 A1* 11/2004 Le et al. ....................... 701/200

* cited by examiner

*Primary Examiner* — Truong Vo
(74) *Attorney, Agent, or Firm* — Winston Hsu; Scott Margo

(57) ABSTRACT

The present invention is directed to a method for integrating road names recorded in a source data, particularly comprising steps of merging all interconnected segments having this road name into a user road group and merging these user road groups if they belongs to the same physical road entity. The present invention also relates to a method for integrating points of interest recorded in a source data, particularly comprising steps of, beginning from node with highest priority in the tree to the other nodes one at a time, finding nodes with same point of interest to redirect all child links of lower priority node to higher priority node among the same point of interest nodes and delete link between the same point of interest nodes; creating geometry relationship based on above new arrangement.

15 Claims, 5 Drawing Sheets

METHOD FOR INTEGRATING ROAD NAMES AND POINTS OF INTEREST IN SOURCE DATA

BACKGROUND OF THE INVENTION

The invention relates to a method for integrating database in navigation system, and more particularly, relates to a method for integrating road names and points of interest (place names) in navigation system.

DESCRIPTION OF RELATED ART

In navigation system such as global positioning system (GPS), according to a map database of discrete data such as road segment and place name, it runs an algorithm for extracting the desired data conforming specific conditions. For example, each road segment has specific fields used for address searching, such as road name(s), zip code, and various level of points of interest (place names). The result shown to users is achieved by calculating and combining fields across the map database. The combination method is similar to following SQL grammer:

Select VestalBlvd, a9, a2, a0, 10572(zipcode) from road segments, where road segments are arranged as a table for all road segments in the map database, and VestalBlvd, a9, a2, a0, 10572 are data fields attached to each segment.

However, if the data fields of the map database are arranged improperly such as repetition, users will get confused after the above selection and combination algorithm. For example, when a new highway is built between an existing road segment, the road segment in the map database sometimes will become two road segments, and thus the result becomes two segments and is confused by users. As another example, if a point of interest in the map database has alias name, the repetition result can not be avoided.

Therefore, a method for integrating road names and places name in the navigation system is desired.

SUMMARY OF THE INVENTION

Accordingly, the present invention is directed to a method for integrating road names recorded in a source data, comprising the steps of: extracting unique road name; for each unique road name, merging all interconnected segments having this road name into a user road group, wherein, as a result, segments having this road name but not interconnected are grouped in a different user road group; merging these user road groups if they belongs to the same physical road entity based on unnamed segments, connectivity across junctions, complex junction, user road overlaps, distance.

In another prospect, the present invention relates to a method for integrating point of interest recorded in a source data, comprising the steps of: extracting all points of interest and assigning priority to each point of interest; loading relationships among the points of interest from the source data and storing the relationship so that hierarchy tree is built and a node with higher priority is a parent of a node with lower priority if they are connected; beginning from node with highest priority in the tree to other nodes with lower priority one at a time, finding nodes with same point of interest to redirect all child links of lower priority node to higher priority node and delete parent link of the lower priority node; creating geometry based on new relationships.

DETAILED DESCRIPTION OF THE INVENTION

Figure 1:
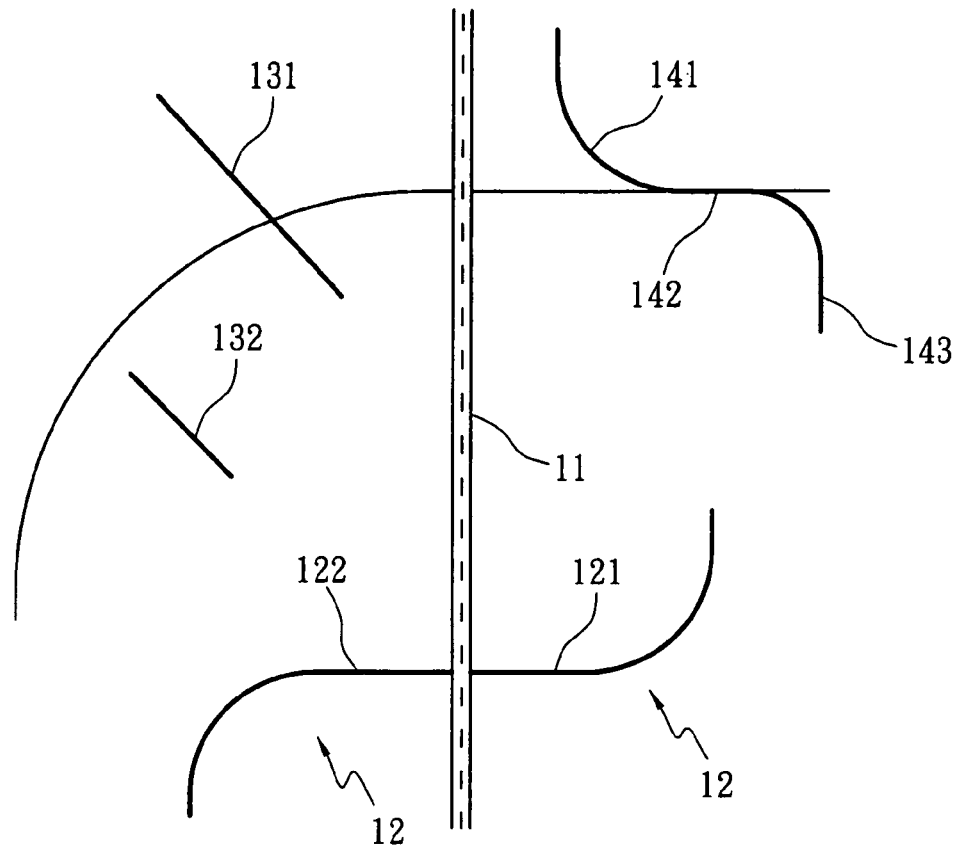
FIG. 1 is a map showing disjoint roads with same road name.

In the following description, like parts are marked with the same reference numerals throughout the specification and drawings.

A method of the present invention are for integrating two fields attached to a road segment, including a road name and a point of interest in map database of navigation system.

The method for integrating road names is firstly described as follows.

A 'road entity' is defined as a collection of discrete digital map road segments sharing one road name. However, it happens but not unusual that a new highway 11, as shown in FIG. 1, is introduced between an existing road segment 12, and thus the road segment 12 is sliced into two disjoint sets (i.e., 121 and 122) of road segment. In FIG. 1, it also shows situations that two disjoint road segments (131, 132) with the identical road name and three road segments (141, 142, 143) having the same road name due to road realignment.

Each road segments has specific attributes attached to them such as house number information, road class (rural, highway etc), road elevation and most importantly the various names given to this road.

The attributes are stored in a separated 'geocoding' table. This table contains one row for each name that a segment is known by. Some segments however might not have any name information attached to them. These 'unnamed' segments do not contain any geocoding attributes and is known as 'unnamed segments'.

Figure 2:
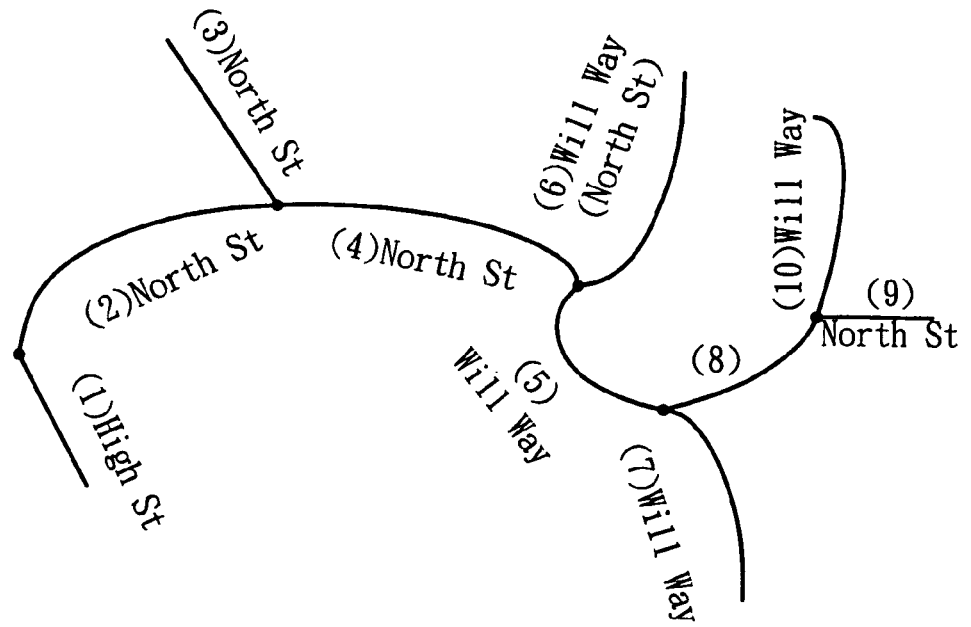
FIG. 2 is another example to show disjoint roads with same road name.

As shown in FIG. 2, it discloses 3 consecutive segments named 'Will Way' that should be part of the same road. And in some cases, the two road segments named 'High St' might be considered by a user to be the same road. The method for integrating road names is used to integrating the above.

In an embodiment, the source data used is as following tables:

GC (Geocode) Table: All names and alternate names for all segments;

RN (Route Number) Table: Route number for all relevant segments;

NW (Road Network & Geometry) Table: Used to extract road geometry and junctions for each segment;

2R (Level 2 Roads) Table: Used to extract road segment groups;

IG (Intersection Index) Table: Use to extract complex intersection-segment memberships;

TA (Transport Element Relationships) Table: Relationships between segments and areas;

The method of the present invention for integrating road names/route number is explained as follows.

Step 1: All unique road names and route numbers recorded in the source data are extracted.

Step 2: Merging all interconnected segments having the same road name or route number one at a time. This is done by the following two stages.

(Stage 1) All segments with one road name/route number are extracted as a new set.

(Stage 2) Picking a random segment from this new set (made in stage 1) and finding all segments connected to this segment. Performing the same operating on all segments of this new set. This continues until no new segments are added. This set is then considered 'one user road'. These segments are added to a segment table (SPG_USER_ROAD_SEG) and a new row is added to a user_road_table (SPG_USER_ROAD). These segments are then removed from the original set and the process continues. Once all segments have been exhausted, the next road/route name is processed.

An example is explained as below by referring to Tables 1 to 4 and FIG. 3.

TABLE 1

| Segment | Road Name/Route No. | Connecting Nodes | | Area No. | Detailed | Zipcode |
|---|---|---|---|---|---|---|
| 1 | Vestal Blvd | A | B | A9 | Skipped . . . | 10511 |
| 2 | Federal Rd | D | I | A9 | | 10511 |
| 3 | 1 St | E | L | A9 | | 10511 |
| 4 | Vestal Blvd | B | G | A8 | | 10513 |
| 5 | Taylor Rd | C | D | A9 | | 10511 |
| 6 | Federal Rd | D | H | A8 | | 10513 |
| 7 | Grand Ave | J | L | A8 | | 10513 |

TABLE 2

| Vestal Blvd | Connected Segments |
|---|---|
| S1 | S3, S4 |
| S4 | S1, S7 |

TABLE 3

| Federal Rd | Connected Segments |
|---|---|
| S2 | S3, S5, S6 |
| S6 | S2, S7 |

Figure 3:
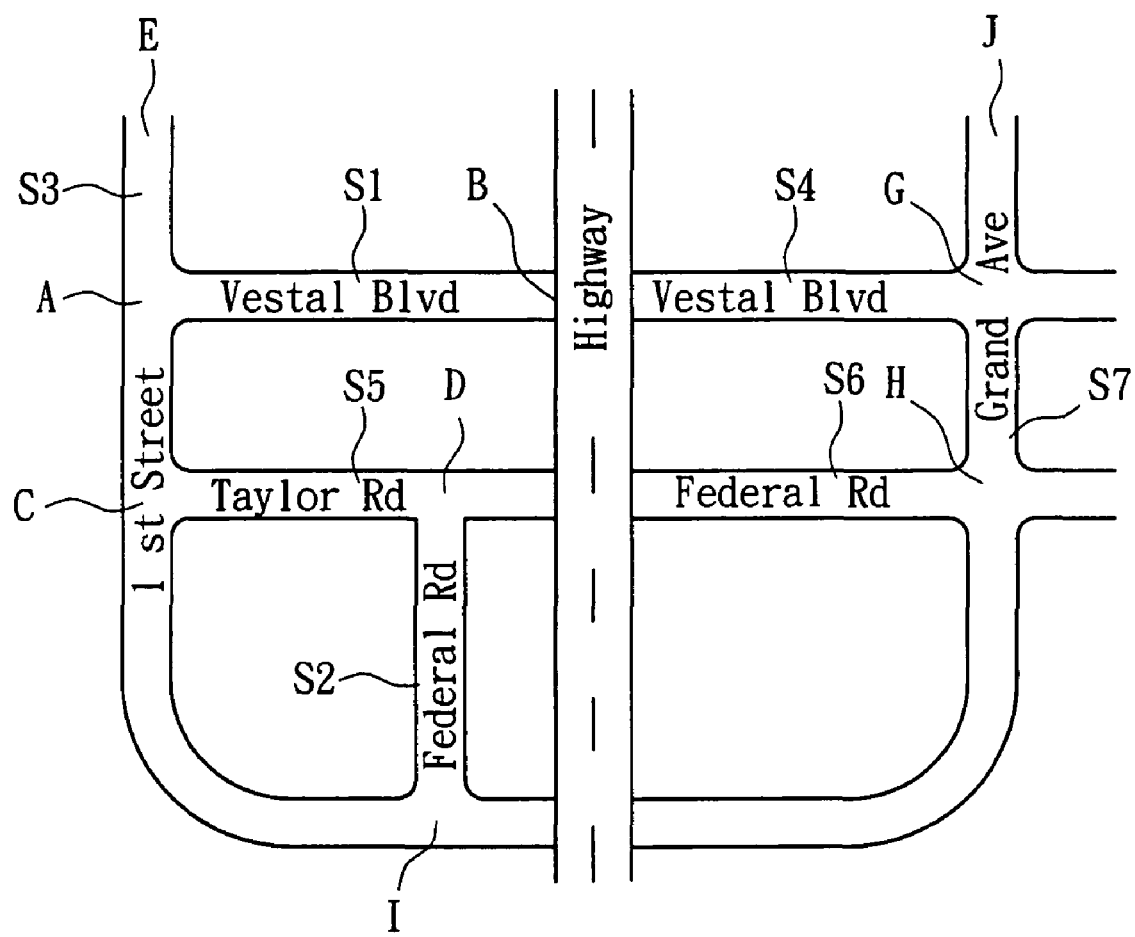
FIG. 3 is a map to explain an example of to a method for integrating road names recorded in a source data of the present invention.

In Table 1, there are 7 segments representing each road segment in the map of FIG. 3. Each segment is defined with fields of 'Road Name/Route Number', 'Nodes', 'Area Number', 'zip code' and the other detailed information such as unit numbers of houses. For example, Segment 2 is defined with 'Federal Rd', 'Connecting Nodes of D and I', 'Area 9', 'Zipcode 10511' and is marked displayed in FIG. 3 with a dark line.

The method of the present invention for integrating road names/route number according to the above example is as follows.

Step (1): All unique road names and route numbers recorded in the source data are extracted as shown in Table 1.

Step (2): 5 new sets are extracted, where 2 sets are shown in Table 2 and Table 3, and the other 3 sets are all single segment set (not shown).

Figure 6:
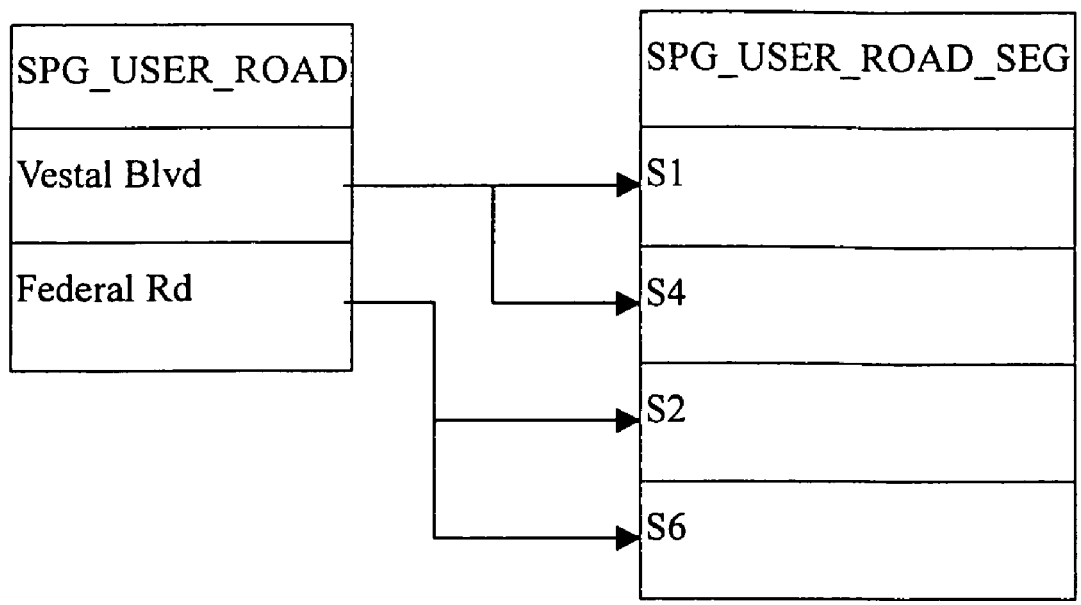
FIG. 6 is a linking diagram showing an example of to a method for integrating road names recorded in a source data of the present invention.

We take Table 2 as an example. There are two segments with name of 'Vestal Blvd', which are S1 and S4. Firstly, S1 is fetched, and S3 and S4 are found as segments connected with S1. Secondly, S4 is fetched, and S1 and S7 are found as segments connected with S4. After further searching, there are not any segments with name of 'Vestal Blvd' connected with S1 or S4. Thenas in FIG. 6, the name of 'Vestal Blvd' is stored in one field of link table 'SPG_USER_ROAD' as a road entity. 'S1' and 'S4' are stored in fields of link table 'SPG_USER_ROAD_SEG' as segments with name of 'Vestal Blvd'. The process for 'Federal Rd' is done in the same manner.

In other words, at this step we only connect road segment if they are with the same named segment.

Step (3): At this step, we have a large set of user roads. Each is guaranteed to contain same named, interconnected segments. We now attempt to see if any of these user roads in fact belong to the same 'physical' road entity. We do this based on certain assumptions and understanding of the road network that a user road might be revisited after the initial trial.

Stage 1: Merge based on unnamed segments.

We check if any of the user roads (with the same name) are connected to each other through a series of unnamed segments. Currently, the length of this series is set to 1 but can be increased to any arbitrary number.

Stage 2: Merge based on Level 2 Roads.

Level 2 Roads (2R) table is defined for grouping road segments based on their connectivity across junctions. As shown in FIG. 1, we use this information to merge same named user roads (121,122) which share the same junction.

Stage 3: Merge based on complex junction.

The IG table contains groups of segments that make up what is known as 'complex' junction. There are usually junctions between dual carriageway and motorway in New Zealand and the Great Britain. As shown in FIG. 1, these entities can be used to merge disjoint similar named user roads (13) which are indirected connected through a complex junction (cj) and combines them into a single user road entity.

Stage 4: Merge based on user road overlaps

At this stage, we might still have many disjoint user roads with the same name. Some of these user roads (131,132) lie on top of larger user roads (13), as shown in FIG. 1. In other words, some user roads (131,132) are defined with the same user road name but is disjoint in a parallel direction with another larger user road (13). We first check for the shortest distance between these user roads (131,132). If this distance is less than 2 km, we join them together to form a single user road entity.

Stage 5: Merge based on distance.

In some cases, we might have two or more disconnected user roads that are very close together. These are quite common where a single road has been cut due to the introduction of a new highway/motorway. The stage attempts to combine these roads into a single user road based on the shortest distance between them In a preferred embodiment, they are combined if this distance is less than 500 meter.

Secondly, the method for integrating points of interest is described as follows.

Source data usually contains many different types of named areas in different data tables. Some of them closely represent the named area for a location and others represent historical names that are still in use. Moreover, source data providers sometimes supply area naming way.

Thus, the integrated points of interest of the present invention help to solve the problems of repeated results and alias result.

A point of interest hierarchy is created by extracting all available points of interest and place hierarchies from the data source. These are then processed and merged to create an interconnected graph of all places and alternate points of interest.

Figure 4:
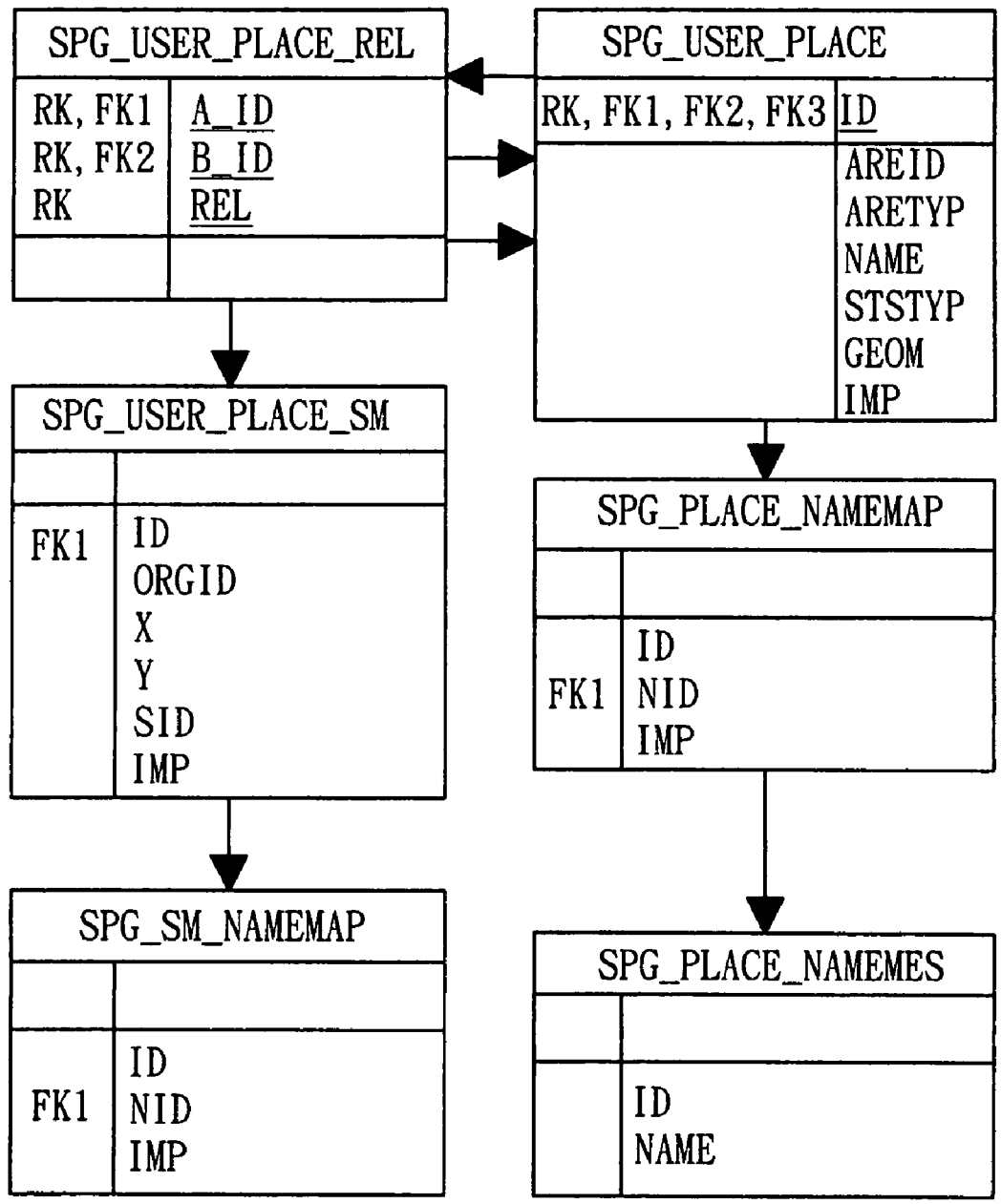
FIG. 4 is a table structure to explain an example of to a method for integrating points of interest recorded in a source data of the present invention.

The source data is extracted from the following table.
[Places and Points of Interest]
A0-A0 (Administrative Area) Tables
  Including alternate names from the AN table
0A06 (Index Area) Table
AP (Administrative Places) Table
  Including alternate names from the NP table
BU (Built-up Areas) Table
  Including alternate names from the BN table
SM (Settlement Names) Table
  Including alternate names from the SMNM table
Relationships
PP Table links 0A06 places into its own hierarchy as well as into the administrative area hierarchy (A0-A9)
BA Table links the BU areas into the admin area hierarchy.
The algorithm as follows utilizes the table structure as shown in FIG. 4.

Step (1): All points of interest are loaded into a user place table (SPG_USER_PLACE) creating a unique user place for each distinctive point of interest. If a given place has multiple names then a separate user place entity is created for each of these. A specific 'priority' is given to each place entity base on its data source. This is done to allow 'official' name of places to be displayed (since it's is possible that a given place has more than one parent).

In a preferred embodiment, the following order of priority is assigned. (Top of the list=highest priority) and thus emphasis is placed on using the Administrative Area hierarchy for official naming (and reverse geocoding)
1. Administrative Areas
2. Index Areas
3. Administrative Places
4. Built-up Areas If a given place does not have a parent Administrative Area, then the list is searched in the above order until a valid parents is found.

Step (2): The settlement names table (SM and SMMN) contains settlement centers and alternate names for these centers. In the preferred embodiment, these names are used as alternate names for the settlements themselves, so no separate entity is created for a 'settlement center', wherein the SM Table links to AX, AP and BU tables.

Step (3): Once all available points of interest have been loaded as user place entities, relationships between them are loaded from the corresponding source data. The relationships are stored in a separate 'relationship' table (SPG_USER_PLACE_REL) which simply consists of two entities and their relation to each other. In a preferred embodiment, the following relationships are extracted.
  A0-A9 tables contain explicit relationships between all administrative areas.
  AP table links all administrative places into the administrative areas.
  BA table links the Built-up areas into the administrative area hierarchy.
  PP table contains a 'place within place' relationship for the Index Areas. These are used link Areas to each other and to create links into the Administrative Area hierarchy.

Step (4): At this stage, we have a complex tree which consists of multiple area hierarchies combined into one. This tree however will always have multiple place entities with the same name connected to each other. An example of this would be an Administrative area called 'New York' contained an Administrative Place called 'New York'. Although both places should be at the same in the place hierarchy, they might be connected to each other through an unwanted 'parent-child' relationship.

At this stage, we perform a merge to clean up the tree and to make points of interest more distinguishable. The aim of the merge is to combine duplicate items into single entities if and only if they can be perceived to the same place.

The detailed stages in the step (4) are as follows.
Stage 1: We start at the top of the place hierarchy and traverse downwards through the nodes of the tree.
Stage 2: At each node, we get all of its child nodes and checks if they have the same name. If two or more children have the same name, then
  (1) Only the entity with the highest priority (as mentioned in the above) is kept;
  (2) The children of the remaining entities are linked to the chosen entity; and
  (3) The child-parent links for all other entities are deleted.
Stage 3: Once the children have been merged, recursively traverse down each of the children.
Stage 4: Once returned, checking if any of the children have the same name as the current parent. If they do, then
  (1) All the child nodes of this selected entity are connected to the parent; and
  (2) The parent-child link between the current parent and child is deleted.

Please note that each time two or more places are merged, a new 'similar' relationship is created between the merged objects. This informs us that these user places are in fact the same object.

Step (5): Creating geometry based relationships. This is the final stage of area processing and this creates new links between current entities based on their geometries. If a given area is completely within another area, we create a parent-child relationship between these two.

An example of the method for integrating points of interest of the present invention is described as follows.

Figure 5A:
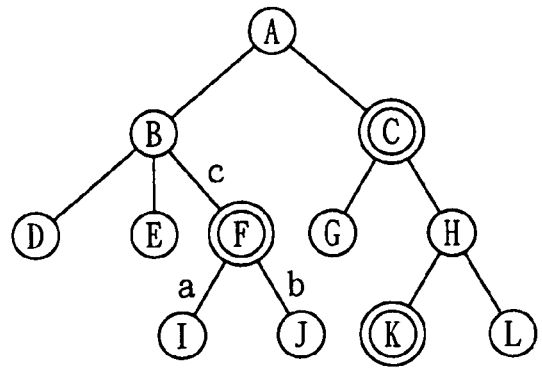
FIG. 5a to FIG. 5c are trees to explain an example of to a method for integrating points of interest recorded in a source data of the present invention.
Figure 5B:
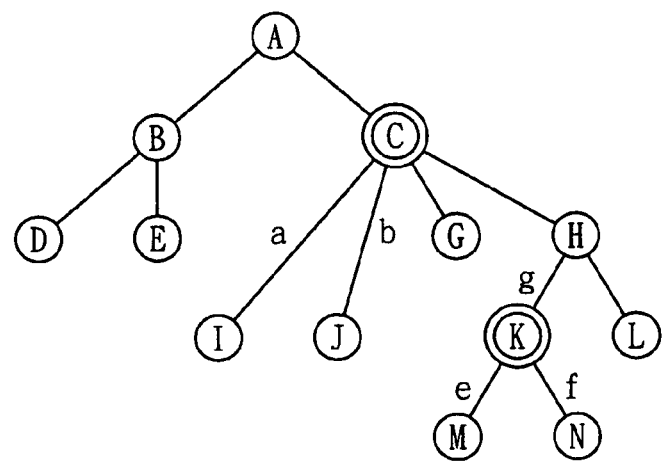
Figure 5C:
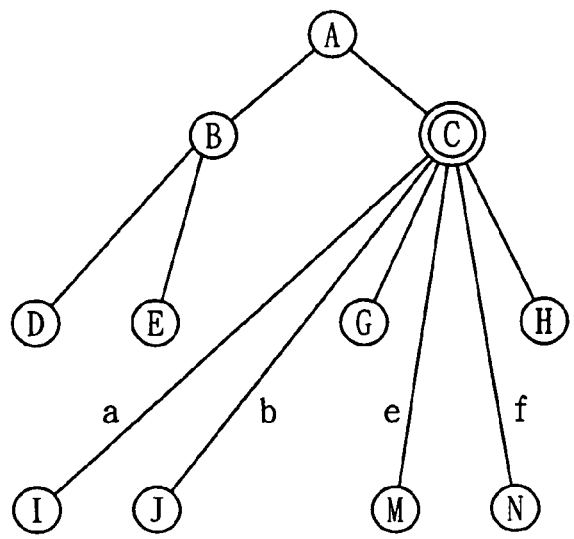

However, in order to abbreviate the description, we assume the relationship of user places can be found in FIG. 5. Please refer to FIG. 5 to understand the algorithm regarding step (4) and step (5) as follows. We also assume node C, node F and node K are in fact the same node.

Step (4):
Stage 1: Start at node A to traverse downwards through the nodes of the tree.
Stage 2: At node A, we find all child nodes of node A, and the we find node C and node F have the same point of interest (FIG. 5a).
  (1) node C which is with higher priority than the node F is kept, and node F is deleted (FIG. 5b);
  (2) The child nodes of node F, which is nodes I and J, are redirected to node C (FIG. 5b);
  (3) The parent link c of node F is deleted (FIG. 5b).
Stage 3: Once the node C has been merged, we recursively traverse down from node C;
Stage 4: We check if any of the children of node C has the same name as node C. We find node K has the same name as node C, and thus
  (1) All the child nodes of node K, which is nodes M and N, are connected to node C;
  (2) The parent link g of node K is deleted.

It should be understood by those skilled in the art that various modifications, combinations, sub-combinations and alternations may occur depending on design requirements and other factors insofar as they are within the scope of the appended claims or the equivalents thereof.

The invention claimed is:

1. A method for integrating road names recorded in a source data, comprising the steps of:
   step 1: extracting unique road names in the source data;
   step 2: for each unique road name, merging all interconnected segments having this road name into a user road group, wherein, as a result, segments having this road name but not being interconnected are grouped in a different user road group;
   step 3: merging segments in user road groups in which each segment in each user road group has the same road name and is not interconnected with other segments in a same user road group when the segments in each user road group are determined to belong to the same physical road entity based on attributes selected from a group consisting of unnamed segments, connectivity across junctions, complex junctions, user road overlaps, and distance.

2. The method for integrating road names recorded in a source data as cited in claim 1, wherein for each unique road name the step 2 includes stages of:
   (1) extracting all segments with the same road name as a set;
   (2) selecting one of segments from this new set at a time to find all segments connected to it until no new segments in the set are found connected, and the set then being considered as one user road group;
   (3) the other segments not found connected are considered as another user road group.

3. The method for integrating road names recorded in a source data as cited in claim 1, wherein the step 3 of merging these user road groups based on unnamed segments comprises checking whether any of the user road groups are connected to each other through a series of arbitrary number of unnamed segments.

4. The method for integrating road names recorded in a source data as cited in claim 1, wherein the step 3 of merging these user road groups based on connectivity across junctions comprises checking whether any same named user road groups share the same junction.

5. The method for integrating road names recorded in a source data as cited in claim 1, wherein the step 3 of merging these user road groups based on complex junction comprises checking whether any same named user road groups are connected across the complex junctions.

6. The method for integrating road names recorded in a source data as cited in claim 1, wherein the step 3 of merging these user road groups based on user road overlaps comprises checking whether any same named user road groups are within 2 kilometers of one another.

7. The method for integrating road names recorded in a source data as cited in claim 1, wherein the step 3 of merging these user road groups based on distance comprises checking whether any same named user road groups are within 500 meters of one another.

8. A method for integrating points of interest recorded in a source data, comprising the steps of:
   step 1: extracting all points of interest and assigning priority to each point of interest;
   step 2: loading relationships among the points of interest from the source data and storing the relationship so that a hierarchy tree is built in accordance with a parent node having higher priority than a child node of the parent node;
   step 3: beginning from a node with highest priority in the hierarchy tree to the child nodes of this node at a time, finding duplicate nodes that refer to the same point of interest, redirecting all child links of duplicate nodes having lower priority to the duplicate node having the highest priority and deleting parent links of the duplicate nodes having lower priority;
   step 4: creating a geometry relationship based on new linking relationships.

9. The method for integrating points of interest recorded in a source data as cited in claim 8, wherein
   the priority for each point of interest is given from high to low according to the sequence of Administrative Areas, Index Areas, Administrative Places, Built-up Areas, and
   when a given point of interest does not have a parent Administrative Area, then the list is searched in the above order until a valid parents is found.

10. The method for integrating points of interest recorded in a source data as cited in claim 8, wherein
    when a settlement name is considered, no separate entity in step 1 is created since the settlement is used as alternated name.

11. The method for integrating points of interest recorded in a source data as cited in claim 8, wherein the relationships in step 3 are stored in a separate relationship table.

12. The method for integrating points of interest recorded in a source data as cited in claim 8, wherein the step 4 includes the following stages:
    stage 1: starting at the top of the place hierarchy and traversing downwards through the nodes of the hierarchy tree;
    stage 2: at each node, finding all of its child nodes that refer to the same point of interest, and when two or more child nodes refer to the same point of interest, then
    only the node with the highest priority among the nodes referring to the same point of interest is kept as a chosen node;
    the child nodes of the nodes referring to the same point of interest with lower priority are linked to the chosen node; and
    the child-parent links for nodes with lower priority among the nodes referring to the same point of interest are deleted;
    stage 3: once the child nodes have been redirected, recursively traversing down each of the child nodes;
    stage 4: once returned, checking whether any of the child nodes have the same name as the current parent node.

13. The method for integrating points of interest recorded in a source data as cited in claim 8, wherein
    each time two or more nodes are redirected, a new relationship is created between the redirected nodes.

14. The method for integrating points of interest recorded in a source data as cited in claim 11, wherein the relationship table consists of two entities and their relation to each other.

15. The method for integrating points of interest recorded in a source data as cited in claim 12, wherein in stage 4 when any of the child node has the same name as the current parent node, then
    (1) all the child nodes of this selected child node are redirected to connect to the parent node; and
    (2) the parent-child link between the parent node and the selected child node is deleted.

* * * * *